(12) United States Patent
Hu

(10) Patent No.: US 9,328,862 B2
(45) Date of Patent: May 3, 2016

(54) MULTIFUNCTIONAL STAND

(71) Applicant: Zhongshan Sirui Photographic Equipment Industry Co., Ltd., Zhongshan, Guangdong (CN)

(72) Inventor: Xiaoyun Hu, Zhongshan (CN)

(73) Assignee: Zhongshan Sirui Photographic Equipment Industry Co., Ltd., Guangdong (CN)

( * ) Notice: Subject to any disclaimer, the term of this patent is extended or adjusted under 35 U.S.C. 154(b) by 53 days.

(21) Appl. No.: 14/239,686

(22) PCT Filed: Nov. 8, 2013

(86) PCT No.: PCT/CN2013/086765
§ 371 (c)(1),
(2) Date: Feb. 19, 2014

(87) PCT Pub. No.: WO2015/062120
PCT Pub. Date: May 7, 2015

(65) Prior Publication Data
US 2015/0122968 A1 May 7, 2015

(30) Foreign Application Priority Data

Nov. 1, 2013 (CN) .......................... 2013 1 0531444

(51) Int. Cl.
*F16M 11/24* (2006.01)
*F16M 11/14* (2006.01)
*F16M 11/38* (2006.01)
(Continued)

(52) U.S. Cl.
CPC .............. *F16M 11/24* (2013.01); *F16M 11/14* (2013.01); *F16M 11/16* (2013.01); *F16M 11/242* (2013.01); *F16M 11/28* (2013.01); *F16M 11/38* (2013.01)

(58) Field of Classification Search
CPC ....... F16M 11/14; F16M 11/24; F16M 11/38; F16M 11/28; F16M 11/16; F16M 11/242
See application file for complete search history.

(56) References Cited

U.S. PATENT DOCUMENTS 2,640,716 A * 6/1953 Bigelow .................. F16L 19/10
                                                             285/341
4,378,172 A * 3/1983 Groschupp ................... 403/104
(Continued)

FOREIGN PATENT DOCUMENTS

| CN | 201215232 Y | 4/2009 |
| CN | 201449508 U | 5/2010 |
| CN | 201698139 U | 1/2011 |

OTHER PUBLICATIONS

First Office Action mailed Jul. 20, 2015, by the Taiwan Intellectual Property Office of Economy Ministry in corresponding Taiwan Patent Application No. TW-103102673, with English translation (10 pages).

*Primary Examiner* — Jeanette E Chapman
(74) *Attorney, Agent, or Firm* — Osha • Liang LLP

(57) ABSTRACT

A multifunctional stand includes a main rod; an adapting platform arranged at the upper end of the main rod and adapted to fix photographic or video shooting equipment; and a supporting seat arranged at the lower end of the main rod and used for supporting the main rod; at the lower end of the main rod is provided a first connecting structure, and at the upper end of the supporting seat is provided a second connecting structure; the first connecting structure and the second connecting structure are detachably connected with each other; and the second connecting structure is adapted to mount the adapting platform.

13 Claims, 7 Drawing Sheets

(51) Int. Cl.
    *F16M 11/16*    (2006.01)
    *F16M 11/28*    (2006.01)

(56) References Cited

U.S. PATENT DOCUMENTS

| | | | | |
|---|---|---|---|---|
| 4,419,025 A | * | 12/1983 | Takahashi | 403/14 |
| 4,872,630 A | * | 10/1989 | Cooper | 248/278.1 |
| 5,594,977 A | * | 1/1997 | McCallion | E04G 17/0707 24/115 M |
| 6,007,259 A | * | 12/1999 | Mori et al. | 396/428 |
| 6,027,087 A | * | 2/2000 | Lindemann et al. | 248/188.5 |
| 7,591,446 B2 | * | 9/2009 | Istas et al. | 248/288.11 |
| 2008/0315058 A1 | * | 12/2008 | Zarpellon | 248/410 |
| 2009/0084912 A1 | * | 4/2009 | Speggiorin | 248/176.3 |
| 2009/0317071 A1 | * | 12/2009 | David | 396/428 |

* cited by examiner

MULTIFUNCTIONAL STAND

CROSS-REFERENCE TO RELATED APPLICATIONS

This is a national stage application based on PCT/CN2013/086765, filed on Nov. 8, 2013, which claims priority to Chinese Patent Application No. 201310531444.3 filed on Nov. 1, 2013. This application claims the priority of these prior applications and incorporates their disclosures by reference in their entireties.

FIELD OF THE INVENTION

The invention relates to a photographic and video shooting equipment, in particular, relates to a multifunctional stand that can be used as a unipod (monopod) and a tripod.

BACKGROUND OF THE INVENTION

In general, skillful shooting in daily life cannot do without the assistance from a tripod or a unipod (monopod). Functions of a stand could not be ignored by a professional user or an amateur user, e.g., the main function of a stand is for stabilizing a camera. Currently, support devices for photographic and video shooting equipment mainly include unipods (monopods) and tripods. Unipods have unique advantages in portability, flexibility and the like, while skillful shooting in an actual shooting process often cannot do without the assistance from a tripod. For example, in night scene shooting, micro shooting and the like, the main function of a tripod is to stabilize a camera to achieve some photographic effects. For outdoor shooting, it can be very inconvenient if a unipod and a tripod are carried at the same time, while for various photographic environments, both kinds of stands may need to be used.

To solve the above problem, Chinese patent document CN201215232Y discloses a multifunctional unipod composed of three supporting legs, a fixed seat connected with the three supporting legs, and a fixing piece for fixing the three supporting legs. When the three supporting legs are combined (collapsed), an independent support leg is formed. The upper ends of the supporting legs are movably connected with the fixed seats via pin shafts. The fixing piece is fixed above the fixed seat and among the upper portions of the three supporting legs via fixing caps. That is, in the multifunctional unipod described in the above patent document, transformation between a tripod and a unipod is achieved by combining (collapsing) the three supporting legs to form one independent support leg. Although the multifunctional unipod described in the above patent document can be used as a unipod, it is actually a tripod and is not really transformed into a unipod.

To solve the above problem, Chinese patent document CN201449508U discloses a detachable transformational structure of a multifunctional shooting tripod, which comprises foot-tube joints, foot-tube joint inserts fixedly connected with the foot-tube joints, tube components, outer tube inserts fixedly connected with the tube components, a tripod-head loading plate, a central tube insert fitted and connected to the tripod-head loading plate, and a central tube fitted and connected to the central tube insert, wherein each foot-tube joint insert can be fitted and connected to an outer tube insert; and a connecting structure fitted to the tripod-head loading plate and the central tube insert can be exchanged with a connecting structure fitted to the foot-tube joint insert and the outer tube insert. That is, in the detachable transformational structure of the multifunctional shooting tripod described in the above patent document, the foot-tube component and the foot-tube joint are connected in a detachable manner, and the tripod-head loading plate and the central tube are also detachable. Meanwhile, the connecting structure fitted to the tripod-head loading plate and the central tube insert can be exchanged with the connecting structure fitted to the foot-tube joint insert and the outer tube insert, i.e., the tripod-head loading plate can be fitted to the central tube insert, and also can be fitted to the outer tube insert, and therefore, when the tripod needs to be used as a unipod, one only needs to detach one foot-tube component from a foot-tube joint and mount the tripod-head loading plate to use the tripod as a unipod.

The multifunctional shooting tripod with the detachable transformational structure described in the above patent documents can realize high-angle shooting, and can be used as an ordinary unipod after being disassembled, but the multifunctional shooting tripod with such a structure cannot be used in low-angle shooting, and cannot satisfy users' requirements in photographic and video shooting equipment and some specific photographic effects in low-angle shooting.

SUMMARY OF THE INVENTION

To this end, a technical problem to be solved by the invention is that the structure of a multifunctional photographic tripod in the prior art can only transform between a conventional tripod and a simple unipod, but cannot be used in low-angle shooting. In view of the above-described problems, it is one objective of the invention to provide a multifunctional stand with a simple structure that can become a high-mounted stand, a simple unipod and a low-angle stand through assembly and disassembly.

To achieve the above objective, in accordance with one embodiment of the invention, there is provided a multifunctional stand, comprising
   a main rod;
   an adapting platform, arranged at an upper end of the main rod and adapted for fixing a photographic or video shooting equipment; and
   a supporting seat for supporting the main rod, arranged at a lower end of the main rod,
   wherein the multifunctional stand further comprises:
     a first connecting structure, provided at the lower end of the main rod;
     a second connecting structure, adapted to mount the adapting platform, provided at an upper end of the supporting seat and detachably connected with the first connecting structure).

In one embodiment, a lower end of the first connecting structure (10) is adapted to connect with a foot pin.

In some embodiments, the first connecting structure comprises an upper joint secured to the lower end of the main rod, and a connecting knob slidably sleeved on the upper joint and restricted from slipping off from a lower end of the upper joint; the second connecting structure comprises a lower joint secured to the upper end of the supporting seat, and a connecting structure formed on the lower joint and adapted to connect with the adapting platform; and the connecting knob is in threaded connection with the lower joint, and the connecting knob is screwed tightly to drive the upper joint to abut the lower joint, so as to allow the main rod to be tightly connected with the supporting seat.

In some embodiments, the upper end of the upper joint is pyramidal, provided with a narrower upper part and a wider lower part; a corresponding pyramidal inner cavity is formed at an upper end of the connecting knob; an internal thread is formed on an inner wall of a lower end of the connecting knob; an external thread matched with the internal thread is formed at an upper end of the lower joint. A foot pin is provided with an external thread so that it can be connected with the internal thread of the connecting knob, thereby the foot pin can protect the bottom end when the stand is used as a unipod (monopod) (FIG. 7).

In some embodiments, the multifunctional stand further comprises a joint sheath, sleeved outside the lower joint, for preventing the external thread of the lower joint from scratching hands.

In some embodiments, the joint sheath is provided with a hollow structure; the lower end of the joint sheath is provided with a circumferential inner wall in threaded connection with the lower joint provided with a circumferential outer wall; a clearance provided between the circumferential inner wall of the upper end of the joint sheath and the circumferential outer wall of the lower joint is adapted for screwing the lower end of the connecting knob therein.

In some embodiments, the first connecting structure comprises an upper joint secured to the lower end of the main rod; the second connecting structure comprises a lower joint secured to the upper end of the supporting seat, a connecting structure is formed on the lower joint and adapted for being connected the adapting platform; a connecting knob is slidably sleeved on the lower joint and restricted from slipping off from the upper end of the lower joint; and the connecting knob is in threaded connection with the upper joint, and the connecting knob is screwed tightly to drive the lower joint to abut against the upper joint, so as to allow the main rod to be tightly connected with the supporting seat.

In some embodiments, the upper end of the lower joint is pyramidal, having a wider upper part and a narrower lower part, and a corresponding pyramidal inner cavity is formed at a lower end of the connecting knob. An internal thread is formed on an inner wall of the upper end of the connecting knob, and an external thread matched with the internal thread is formed at an outer side wall of the upper joint. A foot pin is provided with an internal thread such that it can connect with the external thread of the upper joint to protect the bottom end of the device when used as a monopod (FIG. 7).

In some embodiments, a multifunctional stand of the invention further comprises a joint sheath sleeved outside (over) the upper joint to prevent the external thread of the upper joint from scratching user's hands.

In some embodiments, the joint sheath is provided with a hollow structure; an upper end of the joint sheath is provided with a circumferential inner wall in threaded connection with the upper joint; a clearance between the circumferential inner wall of the lower end of the joint sheath (4) and a circumferential outer wall of the lower joint) is adapted for attaching by screw thread the upper end of the connecting knob therein.

In some embodiments, an anti-rotation structure is provided between the upper joint and the lower joint to prevent the upper joint and the lower joint from rotating relative to each other.

In some embodiments, the anti-rotation structure comprises a clamping head provided with a wider upper part and a narrower lower part, or a clamping slot provided with a narrower upper part and a wider lower part and formed at the lower end of the upper joint, and a clamping slot or a clamping head matched with the clamping head or the clamping slot and formed at the upper end of the lower joint.

In some embodiments, the clamping head is a pyramidal boss, and the clamping slot is in the form of a corresponding pyramidal slot.

In some embodiments, a sleeve member is provided at the upper end of the supporting seat, and a lower joint is secured to the sleeve member.

In some embodiments, the lower end of the lower joint is inserted into the sleeve member and is in threaded connection with the sleeve member; and glue is further applied to positions where the lower joint and the sleeve member fit each other.

In some this embodiments, a connecting structure is a threaded central hole formed on the lower joint and adapted for connection with the adapting platform.

In some embodiments, a stepped hole in the axial direction is formed at the upper end face of the upper joint; the lower end of the main rod is inserted into the stepped hole and abuts a step surface of the stepped hole; an outer wall of the lower end head of the main rod is in threaded connection with an inner wall of the upper joint by means of a thread; and glue is further applied to surfaces where the main rod and the upper joint fit each other.

In some embodiments, the supporting seat is configured as a tripod supporting seat consisting of a fixed seat and short supporting legs distributed and connected at positions surrounding the fixed seat.

In some embodiments, the short supporting legs are foldable supporting legs.

Compared with the prior art, the above technical solutions in accordance with embodiments of the invention have one or more of the following advantages:

(1) In a multifunctional stand of the invention, at the lower end of the main rod is provided with a first connecting structure, and at the upper end of the supporting seat is provided with a second connecting structure; the first connecting structure and the second connecting structure are detachably connected with each other; and the second connecting structure is adapted for mounting an adapting platform. A multifunctional stand of the invention can be used as a high-mounted stand. In addition, the first connecting structure and the second connecting structure are detachably connected with each other, so that the detached main rod can be used as an ordinary unipod (monopod). After the adapting platform is mounted to the detached supporting seat through the second connecting structure, a low-angle stand can be formed to meet the low-angle shooting requirement. Therefore, a multifunctional stand of the invention, when in an assembled state, can be used as a high-mounted stand and can meet high-stand shooting requirement, and the multifunctional stand of the invention can also be used as a simple unipod and a low-mounted stand when disassembled.

(2) In a multifunctional stand of the invention, the lower end of the first connecting structure is adapted for connection with a foot pin, so that the main rod can be used as an ordinary unipod after being detached from the supporting seat.

(3) In a multifunctional stand of the invention, the first connecting structure comprises an upper joint secured to the lower end of the main rod, and a connecting knob slidably sleeved on the upper joint and restricted from slipping off from the lower end of the upper joint. The second connecting structure comprises a lower joint secured to the upper end of the supporting seat, and a connecting structure formed on the lower joint and adapted for being connected with the adapting platform. The connecting knob is in threaded connection with the lower joint, and the connecting knob is screwed tightly to drive the upper joint to abut the lower joint, so as to allow the main rod to be tightly connected with the supporting seat. In accordance with embodiments of the invention, locking between the main rod and the supporting seat is realized in such a manner that the connecting knob sleeved on the upper joint drives the upper joint to abut the lower joint and comes into threaded connection with the lower joint, so that the structure is simple and the assembly and disassembly are convenient.

(4) In a multifunctional stand of the invention, the upper joint is pyramidal, provided with a narrower upper part and a wider lower part, and the upper end of the connecting knob comprises a corresponding pyramidal inner cavity. An internal thread is formed on the inner wall of the lower end of the connecting knob, and an external thread matched with the internal thread is formed at the upper end of the lower joint is formed. Because the upper joint is configured to be pyramidal, having a narrower upper part and a wider lower part, the connecting knob sleeved on the upper joint can be prevented from slipping off from the lower end of the upper joint. Meanwhile, because the upper joint and the connecting knob mate each other by the pyramidal surfaces, the connecting knob applies a certain downward extrusion force to the upper joint in the screwing process, so that the upper joint can tightly abut the lower joint, and relative sliding will not occur after being tightly screwed.

(5) In a multifunctional stand of the invention, outside the lower joint is also sleeved a joint sheath to prevent the external thread of the lower joint from scratching user's hands. The joint sleeve is arranged to prevent the external thread on the lower joint, which is not connected with the connecting knob to prevent it from scratching users' hands or other objects during use.

(6) In a multifunctional stand of the invention, the joint sheath has a hollow structure, and the circumferential inner wall of the lower end of the joint sheath is in threaded connection with the lower joint. A clearance between the circumferential inner wall of the upper end of the joint sheath and the circumferential outer wall of the lower joint is adapted for screwing the lower end of the connecting knob therein, so that when the supporting seat is connected with the adapting platform and used as a low-angle stand, the external thread of the lower joint can be protected by the joint sheath to avoid damages to the external thread. Meanwhile, when connection is made, one end of the connecting knob can be concealed in the clearance, so that the whole structure is more compact and beautiful.

(7) In a multifunctional stand of the invention, the first connecting structure comprises an upper joint secured to the lower end of the main rod; the second connecting structure comprises a lower joint secured to the upper end of the supporting seat. A connecting structure is formed on the lower joint and adapted to connect the adapting platform, and a connecting knob is slidably sleeved on the lower joint and restricted from slipping off from the upper end of the lower joint. The connecting knob is in threaded connection with the upper joint, and the connecting knob is screwed tightly to drive the lower joint to abut the upper joint, so that the main rod is tightly connected with the supporting seat. In accordance with embodiment of the invention, locking between the main rod and the supporting seat is realized in such a manner that the connecting knob sleeved on the lower joint drives the lower joint to abut the upper joint and comes into threaded connection with the upper joint, so that the structure is simple and the assembly and disassembly are convenient.

(8) In a multifunctional stand of the invention, the upper end of the lower joint is like a pyramid which is wider at the upper part and narrower at the lower part, and a corresponding pyramidal inner cavity is formed at the lower end of the connecting knob. An internal thread is formed on the inner wall of the upper end of the connecting knob, and a matched external thread is formed at the outer side wall of the upper joint. Because the upper end of the lower joint is configured to be like a pyramid, which is wider at the upper part and narrower at the lower part, the connecting knob sleeved on the lower joint can be prevented from slipping off from the upper end of the lower joint. Meanwhile, because the lower joint and the connecting knob mate with each other by pyramidal surfaces, the connecting knob applies a certain upward extrusion force to the upper joint in the screwing process, so that the lower joint can tightly abut the upper joint, and relative sliding will not occur after screwing tightly.

(9) In a multifunctional stand of the invention, a joint sheath is sleeved outside the upper joint to prevent the external thread of the upper joint from scratching user's hands. The joint sleeve is arranged to prevent the external thread on the upper joint, which are not connected with the connecting knob, from scratching users' hands or other objects during use.

(10) In a multifunctional stand of the invention, the joint sheath has a hollow structure; the circumferential inner wall of the upper end of the joint sheath is in threaded connection with the upper joint. A clearance between the circumferential inner wall of the lower end of the joint sheath and the circumferential outer wall of the lower joint is adapted for screwing the upper end of the connecting knob therein, so that when the supporting seat is connected with the adapting platform and used as a low-angle stand, the external thread of the upper joint can be protected by the joint sheath to avoid damages to the external threa. Meanwhile, when connection is made, one end of the connecting knob can be concealed in the clearance, so that the whole structure is more compact and beautiful.

(11) In a multifunctional stand of the invention, between the upper joint and the lower joint is also provided with an anti-rotation structure preventing the upper joint and the lower joint from rotating relative to each other. The anti-rotation structure comprises a clamping head provided with a wider upper part and a narrower lower part, or a clamping slot provided with a narrower upper part and a wider lower part and formed at the lower end of the upper joint, and a clamping slot or a clamping head matched with the clamping head or the clamping slot and formed at the upper end of the lower joint. The clamping head and the clamping slot are arranged to ensure that the upper joint and the lower joint will not rotate relative to each other after being fit to each other.

(12) In a multifunctional stand of the invention, at the upper end of the supporting seat is provided a sleeve member, and the lower joint is secured with the sleeve member. The lower end of the lower joint is inserted into the sleeve member and is in threaded connection with the sleeve member; and glue is further applied to positions where the lower joint and the sleeve member fit to each other, so that the lower joint can be tightly connected to the sleeve member without relative rotation.

(13) In a multifunctional stand of the invention, the connecting structure is a threaded central hole formed on the lower joint and adapted for connection with the adapting platform, so that the lower joint can be connected with an adapting screw of the adapting platform through the threaded central hole, so that the stand can be transformed into a low-angle tripod after the adapting platform is connected to the detached supporting seat.

(14) In a multifunctional stand of the invention, the clamping head at the lower end of the upper joint is a pyramidal boss, and the clamping slot is formed as a corresponding pyramidal slot. With the pyramidal configuration, clamping between the clamping head and the clamping slot can be more compact, so that the upper joint and the lower joint will not rotate relative to each other after the clamping head of the upper joint is inserted into the clamping slot of the lower joint.

(15) In a multifunctional stand of the invention, a stepped hole in the axial direction is formed at the upper end face of the upper joint, and the lower end of the main rod is inserted into the stepped hole and abuts a step surface of the stepped hole. The outer wall of the lower end head of the main rod is in threaded connection with the inner wall of the upper joint by means of thread; and glue is further applied to surfaces where the main rod and the upper joint fit to each other, so that the upper joint and the main rod can be connected firmly without falling off.

(16) In a multifunctional stand of the invention, the supporting seat is configured as a tripod supporting seat consisting of a fixed seat and short supporting legs distributed and connected at positions surrounding the fixed seat, so that after the detached supporting seat is connected with the adapting platform through the lower joint, a low-angle tripod can be formed, which not only can meet low-angle shooting requirement, but also has a tripod structure with good stabilizing effect.

(17) In a multifunctional stand of the invention, the short supporting legs are foldable supporting legs, so that in an assembled state, the multifunctional stand of the invention not only can be used as a high-mounted tripod, but also can be used as a high-mounted unipod by folding the three short supporting legs. Meanwhile, when the multifunctional stand of the invention does not need to be used, the short supporting legs can be folded to reduce the size and space occupation of the multifunctional stand.

BRIEF DESCRIPTION OF THE DRAWINGS

In order that the content of the invention is more readily understood clearly, the invention will be further described in details according to particular embodiments of the invention in conjunction with the accompanying drawings, in which.

Figure 1:
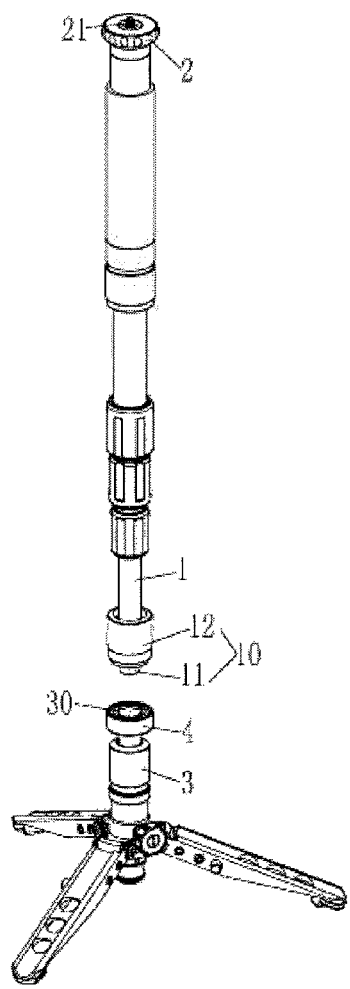
FIG. 1 is a disassembly schematic view of a multifunctional stand of embodiment 1.

Reference numerals in the figures are as follows: 1—main rod; 10—first connecting structure; 11—upper joint; 111—clamping head; 112—stepped hole; 12—connecting knob; 121—pyramidal inner cavity; 122—internal thread; 2—adapting platform; 21—adapting screw; 3—supporting seat; 30—second connecting structure; 31—lower joint; 32—connecting structure; 311—external thread; 312—clamping slot; 33—sleeve member; 4—joint sheath; 5—foot pin.

DETAILED DESCRIPTION OF THE INVENTION

The invention will be further discussed below by using the following embodiments in conjunction with the drawings.

Embodiment 1

Figure 2:
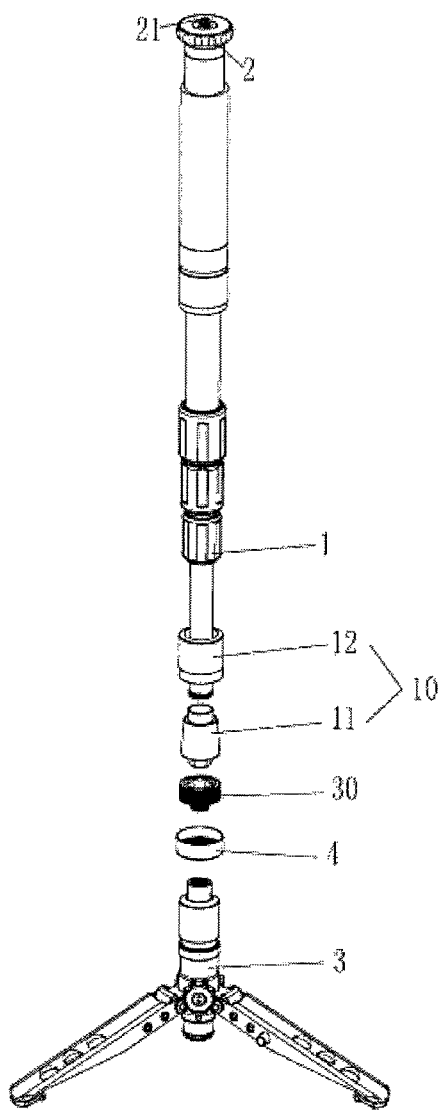
FIG. 2 is an assembly schematic view of the multifunctional stand of embodiment 1.

As shown in FIGS. 1-7, a multifunctional stand of the embodiment comprises a main rod 1; an adapting platform 2 arranged at the upper end of the main rod 1 (FIG. 1) and adapted to fix photographic or video shooting equipment; and a supporting seat 3 arranged at the lower end of the main rod 1 and used for supporting the main rod 1 (FIG. 1). At the lower end of the main rod 1 is provided with a first connecting structure 10 (FIG. 1 and FIG. 2), and at the upper end of the supporting seat 3 is provided with a second connecting structure 30 (FIG. 1 and FIG. 2). The first connecting structure 10 and the second connecting structure 30 are detachably connected with each other; and the second connecting structure 30 is also adapted to mount the adapting platform 2 (for alternative use as a low-angle stand described later). In this embodiment, the multifunctional stand, when in an assembled state, can be used as a high-mount stand and can meet the high-stand shooting requirements. Meanwhile, in this embodiment, the first connecting structure 10 and the second connecting structure 30 are detachably connected with each other, so that the detached main rod 1 can also be used as an ordinary unipod (monopod). In an alternative configuration, after the adapting platform 2 is mounted to the detached supporting seat 3 through the second connecting structure 30 (FIG. 1 and FIG. 6), a low-angle stand can be formed to meet the low-angle shooting requirements. Therefore, a multifunctional stand of the invention can form a high-mounted stand, a simple unipod and a low-angle stand through assembly and disassembly. In summary, a multifunctional stand of the embodiment can meet requirements on various usage occasions.

Figure 3:
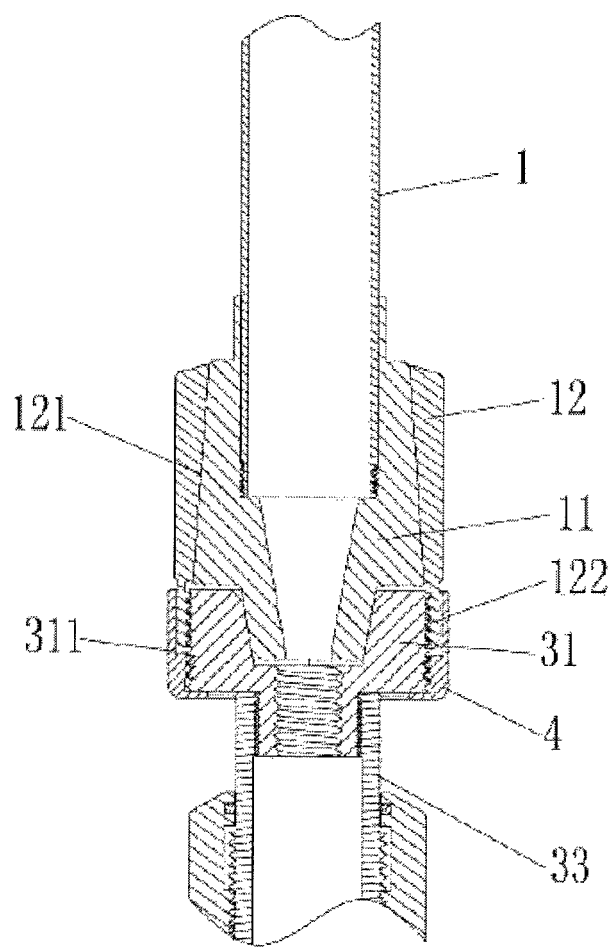
FIG. 3 is a connection schematic view of the multifunctional stand of embodiment 1.
Figure 4:
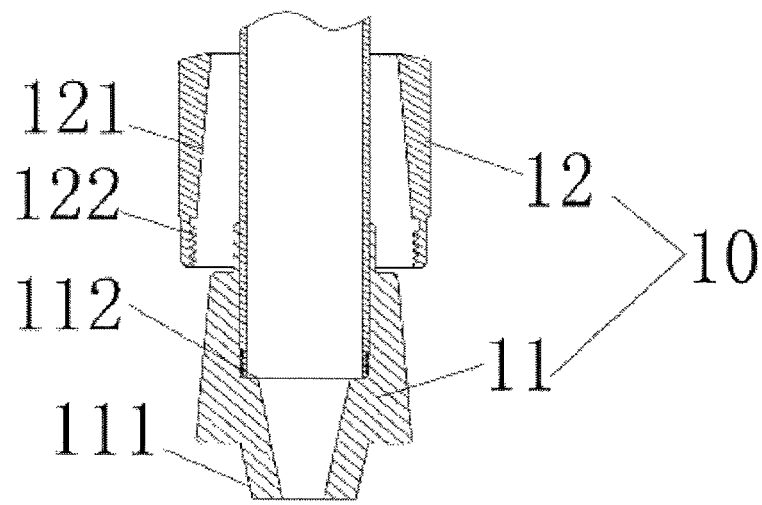
FIG. 4 is a schematic view of a detached main rod of embodiment 1.

The first connecting structure 10 comprises an upper joint 11 secured to the lower end of the main rod 1, and a connecting knob 12 slidably sleeved on the upper joint 11 and restricted from slipping off from the lower end of the upper joint 11 (FIG. 2, FIG. 3 and FIG. 4). The second connecting structure 30 comprises a lower joint 31 secured to the upper end of the supporting seat 3, and a connecting structure 32 formed on the lower joint 31 (FIG. 5) and is also adapted to connect with the adapting platform 2 (in the alternative low-angle stand configuration).

The connecting knob 12 is in threaded connection with the lower joint 31 (FIG. 3), and the connecting knob 12 is screwed tightly to drive the upper joint 11 to abut the lower joint 31 (FIG. 3), so as to allow the main rod 1 to be tightly connected with the supporting seat 3. In this embodiment, locking between the main rod 1 and the supporting seat 3 is realized in such a manner that the connecting knob 12 is sleeved on the upper joint 11 to drive the upper joint 11 to abut the lower joint 31 and the connecting knob 12 makes a threaded connection with the lower joint 31, so that the structure is simple and the assembly and disassembly are convenient.

In a preferred embodiment, the upper joint 11 has pyramidal profile, having a narrower upper part and a wider lower part (FIG. 3), and a corresponding pyramidal inner cavity 121 is formed at the upper end of the connecting knob 12 (FIG. 3). An internal thread 122 is formed on the inner wall of the lower end of the connecting knob 12 (FIG. 3). An external thread 311 matching the internal thread 122 is formed at the upper end of the lower joint 31 (FIG. 3). A foot pin 5 (FIG. 7) is provided with an external thread such that it can connect with the internal thread 122 of the connecting knob 12 (FIG. 7), so that when the main rod 1 together with the adapting platform 2 are detached from the supporting seat 3, and used as an ordinary unipod, the foot pin 5 can be directly connected to the lower end of the connecting knob 12, to prevent damages to the connecting knob 12 or the upper joint 11 during use.

In this embodiment, because the upper joint 11 is configured have a pyramidal profile, having a narrower upper part and a wider lower part, the connecting knob 12, which is sleeved on the upper joint 11, can be prevented from slipping off from the lower end of the upper joint 11. Meanwhile, because the upper joint 11 and the connecting knob 12 match each other by pyramidal surfaces, the connecting knob 12 applies a certain downward push force to the upper joint 11 in the screwing process, so that the upper joint 11 can tightly abut the upper joint 31 (FIG. 3), and relative sliding will not occur after all parts having been tightly screwed together.

Meanwhile, an anti-rotation structure may be provided between the upper joint 11 and the lower joint 31 to prevent the upper joint 11 and the lower joint 31 from rotating relative to each other. In this embodiment, the anti-rotation structure comprises a clamping head 111 (FIG. 4), having a wider upper part and a narrower lower part, formed at the lower end of the upper joint 11, and a clamping slot 312 (FIG. 5) matching the clamping head 111 formed at the upper end of the lower joint 31. With the configuration of the clamping head 111 and the clamping slot 312, the upper joint 11 and the lower joint 31 will not rotate relative to each other after being fit to each other.

Of course, it is also possible to swap the locations of the anti-rotation components such that the clamping slot, having a narrower upper part and a wider lower part, may be formed on the upper joint 11, and the matching clamping head may be formed on the lower joint 31.

In a preferred embodiment, the clamping head 111 at the lower end of the upper joint 11 is a pyramidal boss (such as a hexagonal pyramidal boss), and the clamping slot 312 is formed as a corresponding pyramidal slot (such as a hexagonal pyramidal slot). With the polygonal pyramidal configuration, the clamping between the clamping head 111 and the clamping slot 312 can be more compact, so that the upper joint 11 and the lower joint 31 will not rotate relative to each other after the clamping head 111 is inserted into the clamping slot 312.

Further, in this embodiment, at the upper end of the supporting seat 3 is provided with a sleeve member 33, and the lower joint 31 is secured with the sleeve member 33. The lower end of the lower joint 31 is inserted into the sleeve member 33 and is in threaded connection with the sleeve member 33 (FIG. 5); and glue may be further applied to positions where the lower joint 31 and the sleeve member 33 fit to each other, so that the lower joint 31 can be tightly connected to the sleeve member 33 without relative rotation.

The connecting structure 32 may be a threaded central hole formed on the lower joint 31 (FIG. 5) and also configured for connection with the adapting platform 2 (for use as a low-angle stand). In this embodiment, the threaded central hole 32 is formed at the lower end of the lower joint 31 and is in communication with the clamping slot 312. That is, in this embodiment, the lower joint 31 can be connected with an adapting screw 21 of the adapting platform 2 through the threaded central hole (FIG. 6), so that the stand can be transformed to a low-angle tripod after the adapting platform 2 is connected to the detached supporting seat 3 (FIG. 6).

A stepped hole in the axial direction is formed at the upper end face of the upper joint 11, and the lower end of the main rod 1 is inserted into the stepped hole and abuts a step surface of the stepped hole (FIG. 3 and FIG. 4). The outer wall of the lower end head of the main rod 1 is in threaded connection with the inner wall of the upper joint 11 by means of a thread (FIG. 4); and glue may be further applied to surfaces where the main rod 1 and the upper joint 11 fit to each other, so that the upper joint 11 and the main rod 1 can be connected firmly without falling off.

Based on the above embodiment, a joint sheath 4 is sleeved outside the lower joint 31 (FIG. 5) to prevent the external thread 311 of the lower joint 31 from scratching user's hands. The joint sheath 4 may also prevent the external thread 311 on the lower joint 31 that are not connected with the connecting knob 12 from scratching users' hands or other objects during use.

Figure 5:
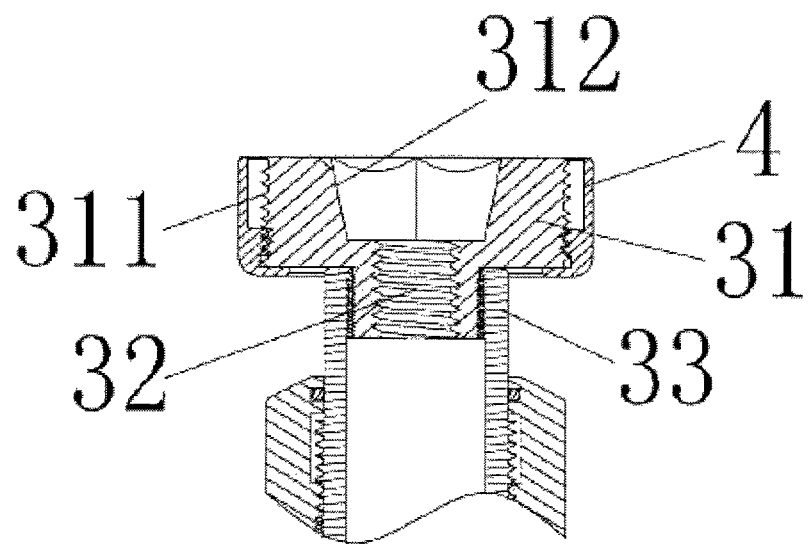
FIG. 5 is a schematic view of a detached supporting seat of embodiment 1.
Figure 6:
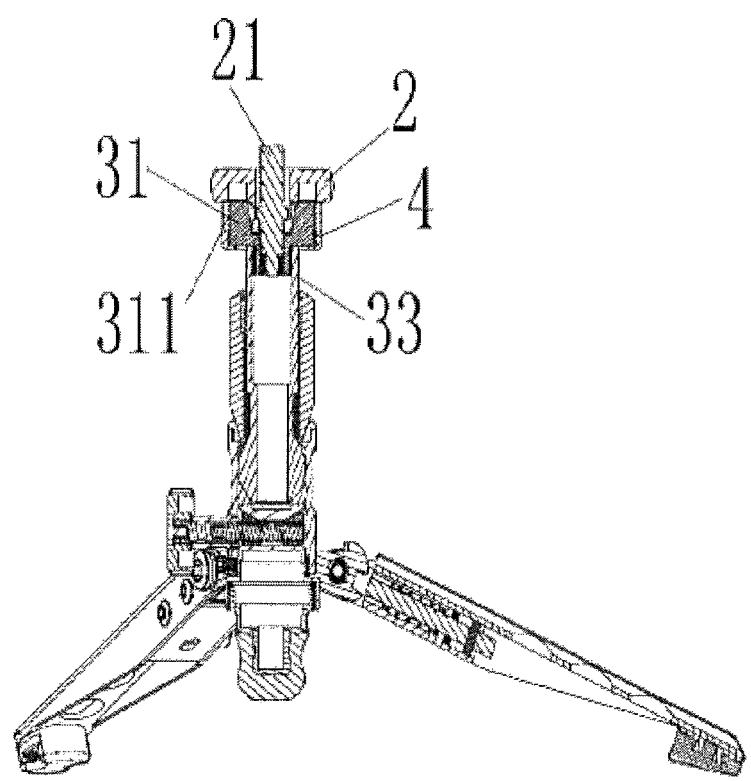
FIG. 6 is a schematic view of a low-angle tripod formed after disassembly of embodiment 1.
Figure 7:
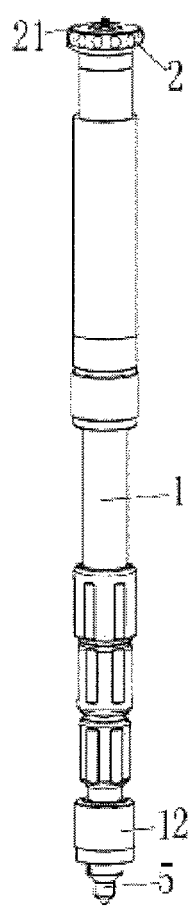
FIG. 7 is a schematic view of an ordinary unipod formed after disassembly of embodiment 1.

In a preferred embodiment, the joint sheath 4 has a hollow structure; the circumferential inner wall of the lower end of the joint sheath 4 is in threaded connection with the lower joint 31 (FIG. 5). A clearance is formed between the circumferential inner wall of the upper end of the joint sheath 4 and the circumferential outer wall of the lower joint 31 and is adapted for screwing the lower end of the connecting knob 12 therein (FIG. 3). In this embodiment, when the supporting seat 3 is connected with the adapting platform 2 and used as a low-angle stand, the external thread 311 of the lower joint 31 can be protected by the joint sheath 4 to avoid damages to the external thread 311 (FIG. 6).

In this embodiment, the supporting seat 3 is configured as a tripod supporting seat consisting of a fixed seat and short supporting legs distributed and connected at positions surrounding the fixed seat (FIG. 1). Thus, after the detached supporting seat 3 is connected with the adapting platform 2 through the lower joint 31 (FIG. 6), a low-angle tripod can be formed, which not only can meet the low-angle shooting requirements, but also has a tripod structure with good stabilizing effect (FIG. 6). Meanwhile, in this embodiment, in order to reduce the size and space occupation of the multifunctional stand, the short supporting legs may be foldable legs (i.e., can be collapsed into a bundle). Thus, when a multifunctional stand of the invention does not need to be used, the short supporting legs can be folded. Meanwhile, with the configuration of the foldable supporting legs, a multifunctional stand of the invention, when in an assembled state, not only can be used as a high-mounted tripod, but also can be used as a high-mounted unipod by folding the three short supporting legs (i.e., collapsing the three legs into a bundle).

Embodiment 2

Figure 8:
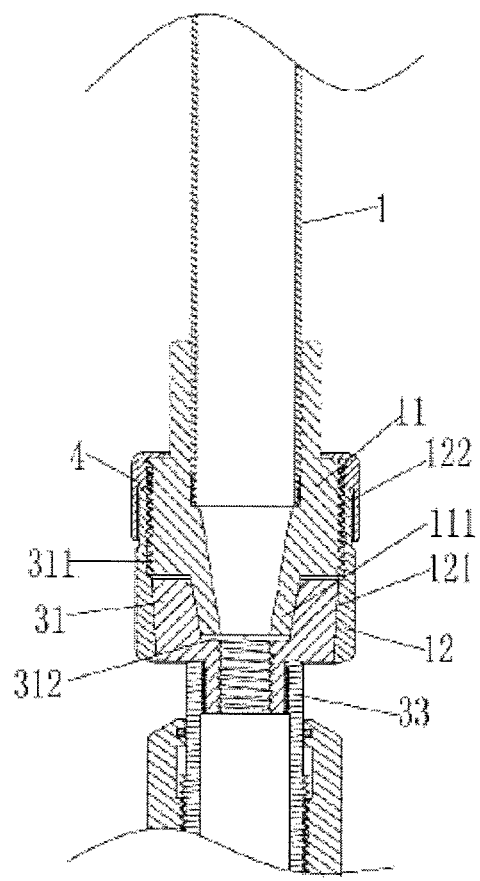
FIG. 8 is a connection schematic view of a multifunctional stand of embodiment 2.

FIG. 8 shows another embodiment that differs from embodiment 1 in that the first connecting structure 10 comprises an upper joint 11 secured to the lower end of the main rod 1; and the second connecting structure 30 comprises a lower joint 31 secured to the upper end of the supporting seat 3. A connecting structure 32 formed on the lower joint 31 and adapted for connection with the adapting platform 2, and a connecting knob 12 slidably sleeved on the lower joint 31 and restricted from slipping off from the upper end of the lower joint 31. The connecting knob 12 is in threaded connection with the upper joint 11, and the connecting knob 12 is screwed tightly to drive the upper joint 11 to abut the lower joint 31, so as to allow the main rod 1 to be tightly connected with the supporting seat 3. In this embodiment, locking between the supporting seat 3 and the main rod 1 is achieved in such a manner that the connecting knob 12 sleeved on the lower joint 31 drives the lower joint 31 to abut against the upper joint 11 and comes into threaded connection with the upper joint 11, so the structure is simple and the assembly and disassembly are convenient.

A preferred configuration is introduced in the embodiment: the upper end of the lower joint 31, on which the connecting knob 12 is sleeved, is pyramidal, having a wider upper part and a narrower lower part. A corresponding pyramidal inner cavity 121 is formed at the lower end of the connecting knob 12; an internal thread 122 is formed on the inner wall of the upper end of the connecting knob 12. An external thread 311 matching the internal thread at the outer side wall of the upper joint 11. A foot pin 5 is provided with an internal thread; and the external thread 311 of the upper joint 11 are adapted for connection with the internal thread of the foot pin 5. In the embodiment, the lower end of the upper joint 11 is adapted for connection with the foot pin 5, so that when the main rod 1 together with the adapting platform 2 are detached from the supporting seat 3, and used as an ordinary unipod, the foot pin 5 can be directly connected to the lower end of the upper joint 11, to prevent damages to the upper joint 11 during use.

A joint sheath 4 is sleeved outside the upper joint 11 to prevent the external thread 311 of the upper joint 11 from scratching user's hands. The structure of the joint sheath 4 is preferable as follows: the joint sheath has a hollow structure; the circumferential inner wall of the upper end of the joint sheath 4 is in threaded connection with the upper joint 11; and a clearance between the circumferential inner wall of the lower end of the joint sheath 4 and the circumferential outer wall of the lower joint 31 is adapted for screwing the upper end of the connecting knob 12 therein.

As the upper end of the lower joint is configured to be pyramidal, having a wider upper part and a narrower lower part, and the connecting knob sleeved on the lower joint can be prevented from slipping off from the upper end of the lower joint. Meanwhile, as the lower joint and the connecting knob are fit to each other by pyramidal surfaces, the connecting knob applies a certain downward push force to the upper joint in the screwing process, so that the lower joint can tightly abut the upper joint, and relative sliding will not occur after screwing tightly.

It is apparent that the above embodiments are only examples for the sake of clear description, instead of limiting the implementing ways. To those of ordinary skill in the relevant art, other modifications or alterations in various forms can also be made based on the above description. It does not need nor is possible to give all implementing ways herein in an exhaustive manner. Obvious modifications or alternations derived therefrom are still in the protection scope of the invention creation.

The invention claimed is:

1. A multifunctional stand, comprising:
a main rod;
an adapting platform, configured to connect at an upper end of the main rod and adapted for fixing a photographic or video shooting equipment;
a supporting seat for supporting the main rod on a lower section of the multifunctional stand;
a first connecting structure, provided at a lower end of the main rod; and
a second connecting structure provided at an upper end of the supporting seat and is configured to detachably connect with the first connecting structure,
wherein the first connecting structure comprises an upper joint secured to the lower end of the main rod, and a connecting knob slidably sleeved on the upper joint and restricted from slipping off from a lower end of the upper joint;
wherein the second connecting structure comprises a lower joint secured to the upper end of the supporting seat, and a connecting structure formed on the lower joint and configured to connect with the adapting platform; and
wherein the connecting knob is in threaded connection with the lower joint, and the connecting knob is screwed tightly to drive the upper joint to abut against the lower joint, so as to allow the main rod to be tightly connected with the supporting seat.

2. The multifunctional stand of claim 1, wherein a lower end of the first connecting structure is configured to connect with a foot pin.

3. The multifunctional stand of claim 2, wherein
the upper end of the upper joint has a pyramidal profile with a narrower upper part and a wider lower part;
a corresponding pyramidal inner cavity is formed at an upper end of the connecting knob;
an internal thread is formed on an inner wall of a lower end of the connecting knob;
an external thread matching the internal thread is formed at an upper end of the lower joint;
the foot pin is provided with an external thread for connecting with the internal thread of the connecting knob.

4. The multifunctional stand of claim 3, further comprising:
a joint sheath, sleeved outside the lower joint, for preventing the external thread of the lower joint from scratching user's hands.

5. The multifunctional stand of claim 4, wherein
the joint sheath has a hollow structure;
the lower end of the joint sheath is in threaded connection with the lower joint; and
a clearance exists between the upper end of the joint sheath and the lower joint, wherein the clearance is configured to accommodate the lower end of the connecting knob therein.

6. The multifunctional stand of claim 1, wherein
an anti-rotation structure is provided between the upper joint and the lower joint to prevent the upper joint and the lower joint from rotating relative to each other.

7. The multifunctional stand of claim 6, wherein
the anti-rotation structure comprises a clamping head formed at the lower end of the upper joint and a matching clamping slot formed at the upper end of the lower joint; or
the anti-rotation structure comprises a clamping slot formed at the lower end of the upper joint and a matching clamping head formed at the upper end of the lower joint.

8. The multifunctional stand of claim 7, wherein
the clamping head is a pyramidal boss, and the clamping slot is a matching pyramidal slot.

9. The multifunctional stand of claim 2, wherein
a sleeve member is provided at the upper end of the supporting seat, and a lower joint is secured to the sleeve member.

10. The multifunctional stand of claim 9, wherein
the lower end of the lower joint is inserted into the sleeve member and is in threaded connection with the sleeve member.

11. The multifunctional stand of claim 2, wherein
a connecting structure is a threaded central hole formed on the lower joint and is configured to connect with the adapting platform.

12. The multifunctional stand of claim 2, wherein
a step hole in the axial direction is formed at the upper end face of the upper joint;
the lower end of the main rod is inserted into the step hole and abuts a step surface of the step hole; and
an outer wall at the lower end of the main rod is in threaded connection with an inner wall of the upper joint.

13. The multifunctional stand of claim 1, wherein
the supporting seat is configured as a tripod supporting seat consisting of a fixed seat and short supporting legs connected at positions surrounding the fixed seat.

* * * * *